US010047482B2

(12) United States Patent
Ohr et al.

(10) Patent No.: US 10,047,482 B2
(45) Date of Patent: Aug. 14, 2018

(54) MINERAL OIL BARRIER

(71) Applicant: Omya International AG, Oftringen (CH)

(72) Inventors: Steffen Ohr, Sursee (CH); Guenter Wimmer, Meerbusch (DE); Philipp Hunziker, Böckten (CH); Michael Kässberger, Sempach (CH); Joachim Schoelkopf, Oberkulm (CH)

(73) Assignee: Omya International AG, Oftringen (CH)

( * ) Notice: Subject to any disclaimer, the term of this patent is extended or adjusted under 35 U.S.C. 154(b) by 123 days.

(21) Appl. No.: 15/119,829

(22) PCT Filed: Feb. 25, 2015

(86) PCT No.: PCT/EP2015/053888
§ 371 (c)(1),
(2) Date: Aug. 18, 2016

(87) PCT Pub. No.: WO2015/132101
PCT Pub. Date: Sep. 11, 2015

(65) Prior Publication Data
US 2017/0073901 A1  Mar. 16, 2017

Related U.S. Application Data

(60) Provisional application No. 61/950,319, filed on Mar. 10, 2014.

(30) Foreign Application Priority Data

Mar. 3, 2014  (EP) .................................... 14157511

(51) Int. Cl.
| D21H 27/10 | (2006.01) |
| D21H 19/38 | (2006.01) |
| D21H 19/44 | (2006.01) |
| D21H 19/60 | (2006.01) |
| D21H 21/52 | (2006.01) |
| B65D 65/42 | (2006.01) |
| C09D 167/02 | (2006.01) |
| D21H 19/46 | (2006.01) |
| D21H 19/62 | (2006.01) |
| D21H 21/14 | (2006.01) |
| C08K 3/26 | (2006.01) |

(52) U.S. Cl.
CPC ............. *D21H 27/10* (2013.01); *B65D 65/42* (2013.01); *C09D 167/02* (2013.01); *D21H 19/38* (2013.01); *D21H 19/385* (2013.01); *D21H 19/44* (2013.01); *D21H 19/46* (2013.01); *D21H 19/60* (2013.01); *D21H 19/62* (2013.01); *D21H 21/14* (2013.01); *D21H 21/52* (2013.01); *C08K 3/26* (2013.01); *C08K 2003/265* (2013.01)

(58) Field of Classification Search
CPC ...... D21H 27/10; D21H 19/385; D21H 19/44; D21H 19/60; D21H 19/38; D21H 19/46; D21H 19/62; D21H 21/52; D21H 21/14; B65D 65/42; C09D 167/02; C08K 3/26; C08K 2003/265
USPC ........................................................ 428/481
See application file for complete search history.

(56) References Cited

U.S. PATENT DOCUMENTS

| 4,442,148 | A | | 4/1984 | Stierli | |
| 4,595,611 | A | * | 6/1986 | Quick | .................. A47J 36/022 220/573.1 |
| 5,766,732 | A | * | 6/1998 | Claytor | .................. B32B 29/04 428/195.1 |
| 6,787,245 | B1 | * | 9/2004 | Hayes | ..................... B32B 27/36 428/480 |
| 2004/0254332 | A1 | * | 12/2004 | Hayes | ..................... B32B 27/36 528/296 |
| 2006/0009610 | A1 | | 1/2006 | Hayes | |
| 2012/0031576 | A1 | | 2/2012 | Gane et al. | |

FOREIGN PATENT DOCUMENTS

| EP | 0811508 A1 | 12/1997 |
| EP | 1770215 A1 | 4/2007 |
| EP | 2070991 A1 | 6/2009 |
| EP | 2159258 A1 | 3/2010 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| GB | 1374075 A | 11/1974 |
| JP | 2007039558 A | 2/2007 |
| JP | 2009214531 A | 9/2009 |
| JP | 2010235885 A | 10/2010 |
| JP | 2012012422 A | 1/2012 |
| JP | 2013209491 A | 10/2013 |
| JP | 2014015037 A | 1/2014 |
| WO | 9951430 A1 | 10/1999 |
| WO | 9967310 A1 | 12/1999 |
| WO | 0136528 A1 | 5/2001 |
| WO | 2004011524 A2 | 2/2004 |

(Continued)

OTHER PUBLICATIONS

The International Search Report dated Apr. 20, 2015 for PCT/EP2015/053888.

(Continued)

*Primary Examiner* — Michael Bernshteyn
(74) *Attorney, Agent, or Firm* — Amster, Rothstein & Ebenstein LLP

(57) ABSTRACT

The present invention is directed to a liquid coating composition comprising at least one terephthalate ionomer comprising anionic substituents selected from sulfonate, carboxylate and/or phosphate groups, wherein the at least one terephthalate ionomer has an acid value of at least 1 mg KOH/g ionomer, at least one calcium carbonate containing filler, and a buffer.

36 Claims, 1 Drawing Sheet

(56) References Cited

FOREIGN PATENT DOCUMENTS

| WO | 2006010062 A1 | 1/2006 |
| --- | --- | --- |
| WO | 2007012935 A2 | 2/2007 |
| WO | 2009074492 A1 | 6/2009 |
| WO | 2010168433 A1 | 12/2012 |
| WO | 2013160199 A1 | 10/2013 |

OTHER PUBLICATIONS

The Written Opinion of the International Searching Authority dated Apr. 20, 2015 for PCT/EP2015/053888.

Notice of Acceptance dated Jan. 12, 2017 from Australian Application No. 2015226378.

Office Action dated Nov. 1, 2017 from Canadian Application No. 2,939,766.

Search Report dated Aug. 29, 2016 from Chilean Application No. 201602170.

Office Action dated May 27, 2017 from Chinese Application No. 201580011749.9.

Office Action dated Jun. 16, 2016 from Eurasian Application No. 201491462.

Extended European Search Report dated Jun. 3, 2014 from European Application No. 14157511.8.

Office Action dated Oct. 17, 2017 from Japanese Application No. 2016-555583.

Office Action dated Sep. 14, 2017 from Korean Application No. 10-2016-7027243.

Office Action dated Jul. 6, 2017 from Russian Application No. 2016138418.

Decision of Grant dated Oct. 26, 2017 from Russian Application No. 2016138418.

Search Report dated Aug. 10, 2017 from Singapore Application No. 11201606550Y.

Office Action dated Oct. 9, 2015 from Taiwan Application No. 104104974.

* cited by examiner

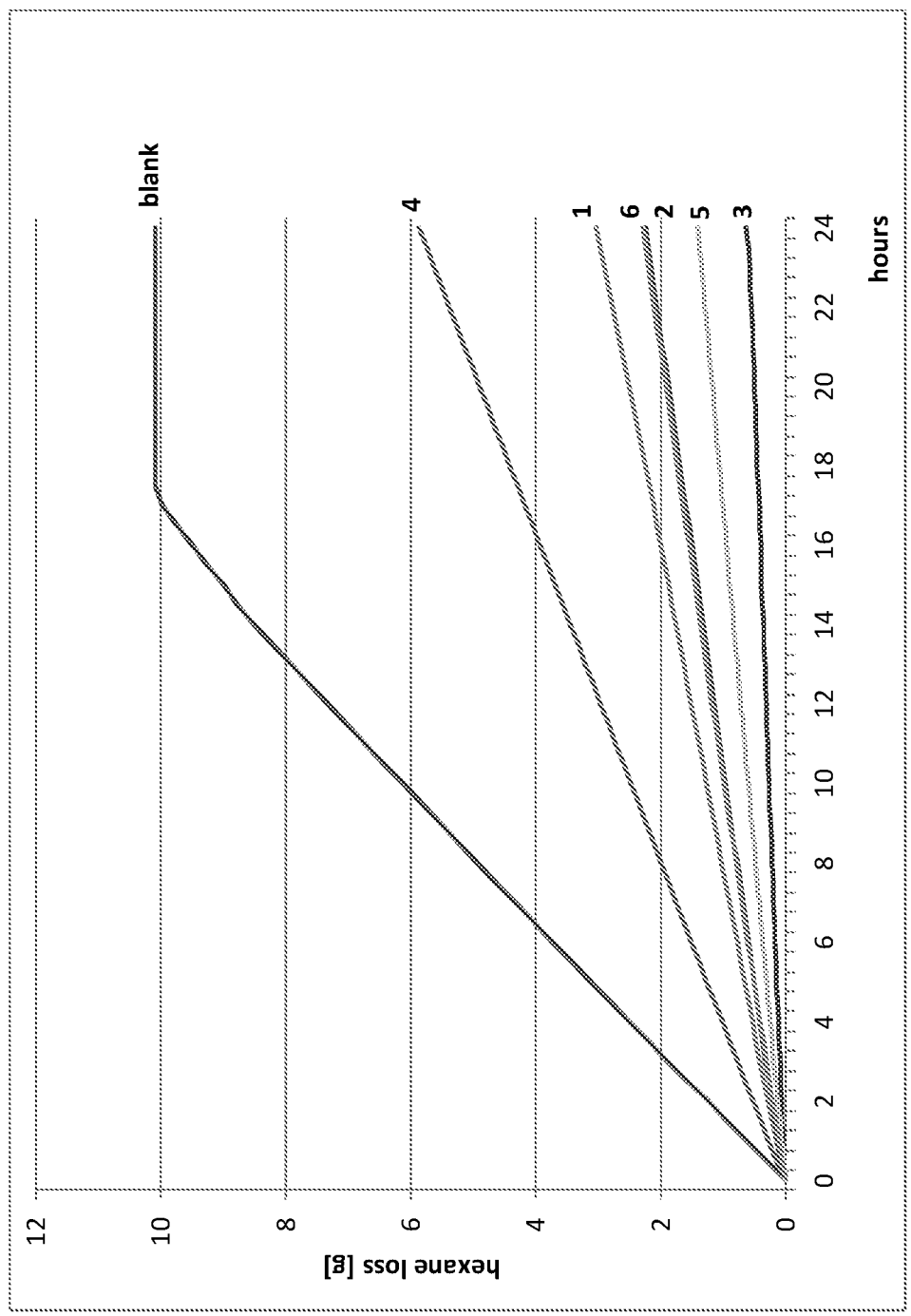

MINERAL OIL BARRIER

CROSS-REFERENCE TO RELATED APPLICATIONS

This is a U.S. national phase of PCT Application No. PCT/EP2015/053888, filed Feb. 25, 2015, which claims priority to European Application No. 14157511.8, filed Mar. 3, 2014 and U.S. Provisional Application No. 61/950,319, filed Mar. 10, 2014.

The invention relates to a liquid coating composition, a method of manufacturing a liquid coating composition, and the use of said composition as a barrier layer for mineral oils and other hydrophobic compounds.

Currently, paper and cardboard containing recycled fibers are widely used as food packaging materials. During the process of recycling, however, mineral oils originating from printing inks as typically used in offset or oil-based flexographic printing, for example, for newsprint, magazines and general packaging, may find their way into the paper or cardboard. If food is packaged into such materials, the mineral oil contaminants can migrate into the food in relatively large quantities.

The problem of migration of mineral oil in food is a subject of intense debates in the whole packaging market, since the German Federal Institute for Risk Assessment (BfR) has classified the potential health risk as critical (see BfR report no. 008/2010, dated 9 Dec. 2009). The opinion of the BfR was confirmed in 2012 by the European Food Safety Authority (EFSA) (see EFSA Panel on Contaminants in the Food Chain (CONTAM), "Scientific opinion on mineral oil hydrocarbons in food", EFSA Journal 2012, 10(6), 2704). For this reason, no detectable migration of mineral oil to food should be allowed to take place.

One possibility to prevent such migration is to protect the food within the packaging material by a proper barrier, for example, an inner bag or a coating on the inner side of the packaging material.

WO 2012/168433 A1 discloses a packaging material having at least one barrier layer for hydrophobic compounds comprising a cross-linked polyvinyl alcohol. The use of polyvinyl alcohols or ethylene/vinyl alcohols as additive to cellulose-based fiber materials for reduction of the migration of oil out of the fiber material is described in WO 2013/160199 A1. Polyvinyl alcohols are water soluble, and thus, usually have to be cross-linked in order to provide a stable barrier layer. Many cross-linkers, however, release or are contaminated with harmful substances such as formaldehyde, aldehyde, or glyoxal, and therefore, may bear additional potential health risks.

EP 1 770 215 A1 relates to a packaging material comprising a moisture and/or grease resistant barrier layer made from a re-dispersible polymer. An improved pre-formed, sheet-like flexible laminate comprising an oil-impermeable polymeric coating is disclosed in U.S. Pat. No. 4,442,148 A. U.S. Pat. No. 6,787,245 B1 describes sulfonated aliphatic-aromatic copolyesters which are useful in forming coatings or films on various substrates. Articles including films, coatings or laminates of aliphatic-aromatic polyetherester compositions are disclosed in US 2004/0254332 A1. US 2006/0009610 A1 is concerned with certain sulfonated copolyetherester compositions containing hydroxyalkanoic acids, which may be used to produce shaped articles. An ink-printed ovenable food container comprising a coating of a sulfonated polyester is described in U.S. Pat. No. 4,595,611 A.

In view of the foregoing, providing further packaging materials which can prevent the migration of mineral oils into the packed food remains of interest to the skilled man.

Accordingly, it is an object of the present invention to provide a barrier layer for a packaging material, which can prevent the migration of hydrophobic substances such as mineral oils, plasticizers or other hydrophobic contaminants into the packed food. It is also an object of the present invention to provide a process for producing a packaging material comprising such a barrier layer. It is also desirable that said packaging material can be produced easily and cost-efficiently. It is also desirable that said packaging material can be produced on a conventional production unit for packaging materials.

It is also an object of the present invention to provide a barrier layer that does not release toxic or harmful substances, is not water dissolvable and is recyclable. It is also desirable to provide a barrier layer that contains a reduced amount of polymer and contains materials that are obtainable from renewable raw materials.

The foregoing and other objects are solved by the subject-matter as defined herein in the independent claims.

According to one aspect of the present invention, a liquid coating composition is provided comprising
 at least one terephthalate ionomer comprising anionic substituents selected from sulfonate, carboxylate and/or phosphate groups, wherein the at least one terephthalate ionomer has an acid value of at least 1 mg KOH/g ionomer,
 at least one calcium carbonate containing filler, and
 a buffer,
 wherein the pH of the liquid coating composition is in the range from 6.5 to 11.

According to another aspect, the present invention provides a process for producing a liquid coating composition comprising the steps of:
 a) providing an aqueous solution and/or dispersion of at least one terephthalate ionomer comprising anionic substituents selected from sulfonate, carboxylate and/or phosphate groups, wherein the at least one terephthalate ionomer has an acid value of at least 1 mg KOH/g ionomer,
 b) providing at least one calcium carbonate containing filler,
 c) mixing the aqueous solution and/or dispersion of the at least one terephthalate ionomer of step a) and the at least one calcium carbonate containing filler of step b),
 wherein a buffer is added
 (i) during step a), or
 (ii) during steps a) and b), or
 (iii) during steps a) and c), or
 (iv) during steps a), b) and c)
to provide in the obtained liquid coating composition a pH in the range from 6.5 to 11.

According to still another aspect, the present invention provides a packaging material comprising
 a cellulose-based substrate having a first and a reverse side, and
 at least one barrier layer being in contact with the first side or the reverse side of the substrate,
 wherein the at least one barrier layer comprises at least one terephthalate ionomer and at least one calcium carbonate containing filler, and
 wherein the at least one terephthalate ionomer comprises anionic substituents selected from sulfonate, carboxylate and/or phosphate groups and has an acid value of at least 1 mg KOH/g ionomer.

According to still another aspect, the present invention provides a process for producing a packaging material comprising the following steps:
A) providing a cellulose-based substrate having a first and a reverse side,
B) applying a liquid coating composition according to the present invention on the first side of the substrate to form a barrier layer, and
C) drying the barrier layer.

According to still another aspect of the present invention, a use of a composition comprising at least one terephthalate ionomer and at least one calcium carbonate containing filler as a barrier layer for packaging materials is provided, wherein the at least one terephthalate ionomer comprises anionic substituents selected from sulfonate, carboxylate and/or phosphate groups and has an acid value of at least 1 mg KOH/g ionomer.

According to still another aspect of the present invention, a use of a packaging material according to the present invention in food packaging applications and/or food displays is provided.

Advantageous embodiments of the present invention are defined in the corresponding sub-claims.

According to one embodiment, the at least one terephthalate ionomer comprises the anionic substituents in an amount from 0.1 to 20 mol-%, preferably from 0.5 to 10 mol-%, and more preferably from 1 to 5 mol-%, based on the total amount of the at least one ionomer. According to another embodiment, the at least one terephthalate ionomer is a sulfonated terephthalate ionomer, preferably comprising the sulfonate groups in an amount from 0.1 to 6 wt.-%, more preferably from 1 to 5 wt.-%, and most preferably from 2 to 4 wt.-% or 3.7 wt.-%, based on the total weight of the at least one ionomer.

According to one embodiment, the at least one calcium carbonate containing filler is selected from calcium carbonate, calcium carbonate containing minerals, or mixtures thereof, preferably the at least one calcium carbonate containing filler is calcium carbonate, and more preferably ground calcium carbonate. According to another embodiment, the at least one calcium carbonate containing filler is in form of particles having a weight median particle size $d_{50}$ from 0.05 to 7 µm, preferably from 0.1 to 5 µm, more preferably from 0.2 to 3 µm, and most preferably from 0.3 to 2 µm.

According to one embodiment, the solids content of the composition is in the range from 25 wt.-% to 75 wt.-%, preferably from 30 to 67 wt.-%, more preferably from 45 to 65 wt.-%, and most preferably from 50 to 62 wt.-%, based on the total weight of the composition. According to one embodiment, the wt.-% ratio of the at least one terephthalate ionomer to the at least one calcium carbonate containing filler is in the range from 95:5 to 20:80, preferably 60:40 to 20:80, more preferably from 55:45 to 30:70, and most preferably from 50:50 to 45:65.

According to one embodiment, the composition further comprises a complexing agent, preferably ammonium zirconium carbonate. According to another embodiment, the at least one terephthalate ionomer is a polyalkylene terephthalate ionomer, preferably a polyethylene terephthalate ionomer. According to still another embodiment, the at least one terephthalate ionomer is co-polymerized with a hydrophobic compound, preferably the hydrophobic compound is a $C_6$ to $C_{24}$ straight chain or branched fatty acid or a triglyceride thereof or a mixture thereof.

According to one embodiment, the inventive process for producing a liquid coating composition further comprises the step of adding a complexing agent before, during and/or after step c).

According to another embodiment, in the inventive process for producing a packaging material, steps B) and C) are also carried out on the reverse side of the substrate to manufacture a packaging material being coated on the first and the reverse side.

It should be understood that for the purpose of the present invention, the following terms have the following meaning:

The "acid value" of a material in the meaning of the present invention refers to the milligrams of potassium hydroxide required to neutralize the free acidic groups in one gram of the material. The acid value of a material is specified in mg KOH/g material. Examples of "acidic groups" in the meaning of the present invention are sulfonate, carboxylate or phosphate groups.

For the purpose of the present invention, the term "barrier layer" refers to one or more coatings, coverings, films, skins etc., formed, created, prepared, etc., from a liquid coating composition which remains predominantly on the surface of the substrate. According to the present invention, the barrier layer can reduce or prevent the migration of hydrophobic substances such as mineral oils, plasticizers and/or hydrophobic contaminants, for example, from a substrate or a packaging material which is covered by the barrier layer.

The term "basis weight" as used in the present invention is determined according to DIN EN ISO 536:1996, and is defined as the weight in $g/m^2$.

A "calcium carbonate containing filler" in the meaning of the present invention can be a material having a content of calcium carbonate of at least 50 wt.-%, preferably 75 wt.-%, more preferably 90 wt.-%, and most preferably 95 wt.-%, based on the total weight of the calcium carbonate containing filler. The calcium carbonate containing filler can be a mineral material, wherein for the purpose of the present invention, a "mineral material" is a solid substance having a definite inorganic chemical composition and characteristic crystalline and/or amorphous structure.

A "cellulose-based substrate" in the meaning of the present invention is a material having a surface suitable for printing or painting on, which comprises at least 50 wt.-% cellulose material such as wood pulp, straw, cotton, bagasse, and the like. Examples of cellulose-based substrates are paper, cardboard, or containerboard.

Throughout the present document, the "degree of sulfonation" is specified as the amount of sulfonate groups expressed in wt.-%, based on the total weight of the terephthalate ionomer. The amount of sulfonate groups can be determined by measuring the amount of sulfur in the ionomer using an elementary analysis. For the elementary analysis a Vario EL III CHNS elemental analyzer from Elementar Analysensysteme GmbH, Germany, can be used.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example by a cyclone or classifier.

The term "intrinsic viscosity" as used in the context of the present invention is a measure of the capability of a polymer in solution to enhance the viscosity of the solution and is specified in dl/g.

An "ionomer" in the meaning of the present invention is a polymer comprising a proportion of the constitutional units having ionizable or ionic groups, or both.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, EP 2 070 991 A1, or 2 264 108 A1.

Throughout the present document, the "particle size" of a calcium carbonate containing filler is described by its distribution of particle sizes. The value $d_x$ represents the diameter relative to which x% by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2,524,898 A1, EP 2 371 766 A1, or unpublished European patent application no. 12 164 041.1.

For the purpose of the present invention, a "rheology modifier" is an additive that changes the rheological behaviour of a slurry or a liquid coating composition to match the required specification for the coating method employed.

In the meaning of the present invention, a "surface-treated calcium carbonate" is a ground, precipitated or modified calcium carbonate comprising a treatment or coating layer, e.g. a layer of fatty acids, surfactants, siloxanes, or polymers.

For the purpose of the present invention, the "thickness" and "layer weight" of a layer refers to the thickness and layer weight, respectively, of the layer after the applied coating composition has been dried.

For the purpose of the present invention, the "solids content" of a liquid composition is a measure of the amount of material remaining after all the solvent or water has been evaporated.

For the purpose of the present invention, the term "viscosity" or "Brookfield viscosity" refers to Brookfield viscosity. The Brookfield viscosity is for this purpose measured by a Brookfield (Typ RVT) viscometer at 20° C.±2° C. at 100 rpm using an appropriate spindle and is specified in mPa·s.

A "suspension" or "slurry" in the meaning of the present invention comprises insoluble solids and water, and optionally further additives, and usually contains large amounts of solids and, thus, is more viscous and can be of higher density than the liquid from which it is formed.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive liquid coating composition comprises at least one terephthalate ionomer, at least one calcium carbonate containing filler, and a buffer. The at least one terephthalate ionomer comprises anionic substituents selected from sulfonate, carboxylate and/or phosphate groups and has an acid value of at least 1 mg KOH/g ionomer. The pH of the liquid coating composition is in the range from 6.5 to 11.

In the following details and preferred embodiments of the inventive composition will be set out in more details. It is to be understood that these technical details and embodiments also apply to the inventive process, the use of the inventive composition, and products comprising the inventive composition.

Terephthalate Ionomer

The liquid coating composition of the present invention comprises at least one terephthalate ionomer comprising anionic substituents selected from sulfonate, carboxylate and/or phosphate groups, wherein the at least one terephthalate ionomer has an acid value of at least 1 mg KOH/g ionomer.

The at least one terephthalate ionomer of the present invention can be described as being a polyester resulting from polycondensation of terephthalic acid or one of its polyester-forming derivates and a diol. Suitable polyester-forming derivates of terephthalic acid are dimethyl terephthalate, diethyl terephthalate, dipropyl terephthalate, dibutyl terephthalate, or mixtures thereof. Examples of suitable diols are alkanediols, e.g. alkanediols having 2 to 12 carbon atoms in the carbon chain such as ethylene glycol, propanediol, butanediol, pentanediol, hexanediol, heptanediol, octanediol, nonanediol, decanediol, undecanediol, dodecanediol, or mixtures thereof.

According to one embodiment, the at least one terephthalate ionomer is a polyalkylene terephthalate ionomer, preferably a polyethylene terephthalate ionomer, a polypropylene terephthalate ionomer, or a polybutylene terephthalate ionomer.

A part of the terephthalic acid or one of its polyester-forming derivates in the polyalkylene terephthalate ionomer can be replaced by other dicarboxylic acids. Examples of suitable dicarboxylic acids are isophthalic acid, phthalic acid, 1,4-cylclohexanedicarboxylic acid, naphthalene-2,6-dicarboxylic acid, adipic acid, sebacic acid or decanedicarboxylic acid. According to one embodiment up to 5 mol-%, preferably up to 10 mol-%, more preferably up to 20 mol-%, and most preferably up to 30 mol-% of the terephthalic acid or one of its polyester-forming derivates in the polyalkylene terephthalate ionomer are replaced by other dicarboxylic acids.

A part of the alkanediol in the polyalkylene terephthalate ionomer can be replaced by other diols. Examples of suitable other diols are neopentyl glycol, 1,4- or 1,3-dimethylolcyclohexane. According to one embodiment up to 5 mol-%, preferably up to 10 mol-%, more preferably up to 20 mol-%, and most preferably up to 30 mol-% of the alkanediol in the polyalkylene terephthalate ionomer are replaced by other diols.

According to the present invention the at least one terephthalate ionomer comprises unmodified and modified terephthalate. The terephthalate ionomer may be a linear polymer, a branched polymer, or a cross-linked polymer. For example, if glycerol is allowed to react with a diacid or its anhydride each glycerol unit will generate a branch point. If internal coupling occurs, for example, by reaction of a hydroxyl group and an acid function from branches at the same or a different molecule, the polymer will become crosslinked. Optionally, the at least one terephthalate ionomer can be substituted, preferably with a $C_1$ to $C_{10}$ alkyl group, a hydroxyl, and/or an amine group. According to one embodiment, the at least one terephthalate ionomer is substituted with a methyl, ethyl, propyl, butyl, tert.-butyl, hydroxyl and/or amine group.

The at least one terephthalate ionomer can also be modified by co-polymerization. According to one embodiment, the at least terephthalate ionomer is co-polymerized with at least one hydroxyl-functional compound having at least two hydroxyl groups and/or at least one carboxy-functional compound having at least two carboxyl groups and/or at least one hydrophobic compound. According to a preferred embodiment of the present invention, the at least one terephthalate ionomer is co-polymerized with at least one hydrophobic compound. According to another embodiment, the at least one terephthalate ionomer is not co-polymerized with a hydrophobic compound.

The at least one terephthalate ionomer can comprise the at least one hydroxyl-functional compound having at least two hydroxyl groups in an amount up to 40 wt.-%, based on the total weight of the at least one terephthalate ionomer. Examples of said hydroxy-functional compound are ethylene glycol, diethylene glycol, triethylene glycol, cyclohexanedimethanol, propylene glycol, 1,2-propylene glycol, 1,3-propanediol, 1,2-butylene glycol, 1,3-butanediol, 1,4-butanediol, neopentyl glycol, 1,5-pentanediol, 1,6-hexanediol, glycerol, trimethylolpropane, trimethylolethane, pentaerythritol, erythritol, sorbitol, glycerol or monosaccharides such as a monosaccharide oxyalkylated with 5-30 moles of ethylene oxide, propylene oxide or a mixture thereof.

The at least one terephthalate iononomer can comprise the at least one carboxy-functional compound having at least two carboxyl groups in an amount up to 20 wt.-%, based on the total weight of the at least one terephthalate ionomer. Examples of said carboxy-functional compounds are difunctional acids or acid anhydrides such as isophthalic acid, phthalic acid, trimellitic anhydride, trimellitic acid or maleic anhydride.

The at least one terephthalate ionomer can comprise the at least one hydrophobic compound in an amount from up to 60 wt.-%, based on the total weight of the at least one terephthalate ionomer. Preferably, said hydrophobic compound is a $C_6$ to $C_{24}$ straight chain or branched fatty acid or a triglyceride thereof or a mixture thereof. Examples of said hydrophobic compound are stearic acid, behenic acid, palmitic acid, lauric acid, linoleic acid, triglycerides from animal or vegetable sources such as beef tallow, corn oil, soybean oil, peanut oil, safflower oil, or hydrogenated versions thereof, reactive silicones, blown paraffins or mineral oils or hydrophobic urethanes.

As indicated by the term "ionomer" the terephthalate ionomer of the present invention comprises a proportion of constitutional units which have ionizable or ionic groups, or both. The at least one terephthalate ionomer of the present invention can be a sulfonated, carboxylated and/or phosphated terephthalate ionomer, preferably a sulfonated, carboxylated and/or phosphated polyethylene terephthalate ionomer. In other words, the at least one terephthalate ionomer comprises anionic substituents selected from sulfonate, carboxylate and/or phosphate groups. Said substituents may be introduced into the terephthalate ionomer during the polymerization of the ionomer by adding a certain amount of terephthalic acid or one of its polyester-forming derivates and/or diol monomers to the polymerization mixture, which comprise substituents selected from sulfonate, carboxylate and/or phosphate groups. Alternatively or additionally, phthalic acid or isophthalic acid monomers comprising substituents selected from sulfonate, carboxylate and/or phosphate groups may be added during the polymerization of the terephthalate ionomer. Examples of such monomers are dimethyl-5-sulfoisophthalate (DMSIP) and sulfoisophthalate ethylene glycol (SIPEG). The sulfonate, carboxylate and/or phosphate groups of the at least one terephthalate ionomer may be present in protonated or deprotonated form.

The at least one terephthalate ionomer may consist of only one type of terephthalate ionomer. Alternatively, the at least one terephthalate ionomer can consist of a mixture of two or more types of terephthalate ionomers.

According to one embodiment, the at least one terephthalate ionomer comprises anionic substituents selected from sulfonate, carboxylate and/or phosphate groups, wherein the at least one terephthalate ionomer has an acid value of at least 1 mg KOH/g ionomer, and wherein the at least one terephthalate ionomer is not a polyethylene terephthalate ionomer. Preferably, the at least one terephthalate ionomer is not a polyethylene terephthalate ionomer consisting of ethylene glycol and terephthalate units only. As explained above, said ethylene glycol and terephthalate units can comprise substituents selected from sulfonate, carboxylate and/or phosphate groups.

According to a preferred embodiment, the at least one terephthalate ionomer of the present invention is at least one polyethylene terephthalate ionomer. Preferably, the at least one polyethylene terephthalate ionomer can consist of ethylene glycol and terephthalate units only, wherein said ethylene glycol and terephthalate units can comprise substituents selected from sulfonate, carboxylate and/or phosphate groups.

Polyethylene terephthalate (PET) is a condensation polymer and may be industrially produced by condensating either terephthalic acid or dimethyl terephthalate with ethylene glycol.

PET may be polymerized by ester interchange employing the monomers dimethyl terephthalate and ethylene glycol or direct esterification by employing the monomers terephthalic acid and ethylene glycol. Both ester interchange and direct esterification processes are combined with polycondensation steps either batch-wise or continuously. Batch-wise systems require two reaction vessels; one for esterification or ester interchange and one for polymerization. Continuous systems require at least three vessels; one for esterification or ester interchange, another for reducing excess glycols, and still another for polymerization.

Alternatively, PET may be produced by solid-phase polycondensation. For example, in such a process a melt polycondensation is continued until the pre-polymer has an intrinsic viscosity of 1.0 to 1.4 dl/g, at which point the polymer is cast into a solid film. The pre-crystallization is carried out by heating, e.g. above 200° C., until the desirable molecular weight of the polymer is obtained.

According to one embodiment of the present invention, the at least one terephthalate ionomer comprises the anionic substituents in an amount from 0.1 to 20 mol-%, preferably from 0.5 to 10 mol-%, and more preferably from 1 to 5 mol-%, based on the total amount of the at least one ionomer. The anionic substituents are selected from sulfonate, carboxylate and/or phosphate groups.

According to one preferred embodiment, the at least one terephthalate ionomer is a sulfonated terephthalate ionomer, preferably comprising the sulfonate groups in an amount from 0.1 to 6 wt.-%, more preferably from 1 to 5 wt.-%, and most preferably from 2 to 4 wt.-% or about 3.7 wt.-%, based on the total weight of the at least one ionomer.

The at least one terephthalate ionomer of the present invention has an acid value of at least 1 mg KOH/g ionomer. It is clear to the skilled person that the acid value of the at least one terephthalate ionomer depends on the amount of anionic substituents that are attached to said ionomer. According to one embodiment of the present invention, the at least one terephthalate ionomer has an acid value from 5 to 50 mg KOH/g ionomer.

According to one embodiment of the present invention, the at least one terephthalate ionomer has a weight molecular weight $M_w$ from 100 to 100000 g/mol, preferably from 200 to 8000 g/mol, more preferably from 400 to 5000 g/mol, and most preferably from 600 to 3000 g/mol.

According to another embodiment of the present invention, the at least one terephthalate ionomer has an intrinsic viscosity from 0.1 to 1.0 dl/g, preferably from 0.2 to 0.8 dl/g, and more preferably from 0.25 to 0.5 dl/g.

The introduction of the sulfonate, carboxylate and/or phosphate groups into the terephthalate ionomer promotes solubility and/or dispersibility of the ionomer in water. According to one embodiment of the present invention, the at least one terephthalate ionomer is water-dispersible. According to another embodiment of the present invention, the at least one terephthalate ionomer is water-soluble.

Without being bound to any theory, it is believed that the solubility of the at least one terephthalate ionomer increases with the amount of anionic substituents, which are attached to the at least one terephthalate ionomer. In other words, the solubility of the at least one terephthalate ionomer is a measure for the anionicity of the ionomer, and thus, represents a further selection criteria for the at least one terephthalate ionomer. According to one embodiment of the present invention, the at least one terephthalate ionomer has a solubility such that from 1 to 70 wt.-%, preferably from 5 to 60 wt.-%, more preferably from 10 to 50 wt.-%, and most preferably from 20 to 45 wt.-%, based on the total weight of the obtained ionomer/water solution, of the ionomer can be dissolved in water by stirring the obtained ionomer/water solution for 60 min at 95° C. with 100 to 2000 rpm.

According to a preferred embodiment of the present invention, the least one terephthalate ionomer, preferably polyethylene terephthalate ionomer, comprises anionic substituents selected from sulfonate, carboxylate and/or phosphate groups, has an acid value of at least 1 mg KOH/g ionomer, and has a solubility such that from 1 to 70 wt.-%, based on the total weight of the obtained ionomer/water solution, of the ionomer can be dissolved in water by stirring the obtained ionomer/water solution for 60 min at 95° C. According to another preferred embodiment of the present invention, the least one terephthalate ionomer, preferably polyethylene terephthalate ionomer, comprises anionic substituents selected from sulfonate, carboxylate and/or phosphate groups, has an acid value of at least 1 mg KOH/g ionomer, has a solubility such that from 1 to 70 wt.-%, based on the total weight of the obtained ionomer/water solution, of the ionomer can be dissolved in water by stirring the obtained ionomer/water solution for 60 min at 95° C. with 100 to 2000 rpm, and has a weight molecular weight $M_w$ from 100 to 100000 g/mol and/or an intrinsic viscosity from 0.1 to 1.0 dl/g. Preferably the at least one terephthalate ionomer is a sulfonated terephthalate ionomer, preferably comprising the sulfonate groups in an amount from 0.1 to 6 wt.-%, based on the total weight of the ionomer, and more preferably the at least one terephthalate ionomer is a sulfonated polyethylene terephthalate ionomer comprising the sulfonate groups in an amount from 0.1 to 6 wt.-%, based on the total weight of the ionomer.

Calcium Carbonate Containing Filler

In addition to the at least one terephthalate ionomer described above, the liquid coating composition of the present invention comprises at least one calcium carbonate containing filler.

The calcium carbonate containing filler can be selected from calcium carbonate, calcium carbonate containing minerals, mixed calcium carbonate based fillers, or mixtures thereof. Calcium carbonate may be selected from ground calcium carbonate, precipitated calcium carbonate, modified calcium carbonate or mixtures thereof.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Natural calcium carbonate is almost exclusively of the calcitic polymorph, which is said to be trigonal-rhombohedral and represents the most stable of the calcium carbonate polymorphs. The term "source" of the calcium carbonate in the meaning of the present invention refers to the naturally occurring mineral material from which the calcium carbonate is obtained. The source of the calcium carbonate may comprise further naturally occurring components such as magnesium carbonate, alumino silicate etc.

According to one embodiment of the present invention, the ground calcium carbonate is selected from the group consisting of marble, chalk, dolomite, limestone and mixtures thereof.

According to one embodiment of the present invention the GCC is obtained by dry grinding. According to another embodiment of the present invention the GCC is obtained by wet grinding and optionally subsequent drying.

In general, the grinding step can be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate comprises one precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

A modified calcium carbonate may feature a GCC or PCC with an internal structure modification or a surface-reacted GCC or PCC. A surface-reacted calcium carbonate may be prepared by providing a GCC or PCC in form of an aqueous suspension, and adding an acid to said suspension. Suitable acids are, for example, sulfuric acid, hydrochloric acid, phosphoric acid, citric acid, oxalic acid, or a mixture thereof. In a next step, the calcium carbonate is treated with gaseous carbon dioxide. If a strong acid such as sulfuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, or EP 2 264 108 A1.

A surface-treated calcium carbonate may feature a GCC, PCC, or MCC comprising a treatment or coating layer on its surface. For example, the calcium carbonate may be treated or coated with a hydrophobising surface treatment agent such as, e.g., aliphatic carboxylic acids, salts or esters thereof, or a siloxane. Suitable aliphatic acids are, for example, $C_5$ to $C_{28}$ fatty acids such as stearic acid, palmitic acid, myristic acid, lauric acid, or a mixture thereof. The calcium carbonate may also be treated or coated to become cationic or anionic with, for example, a polyacrylate or polydiallyldimethylammonium chloride (polyDADMAC). Surface-treated calcium carbonates are, for example, described in EP 2 159 258 A1.

According to one embodiment, the modified calcium carbonate is a surface-reacted calcium carbonate, preferably obtained from the reaction with sulfuric acid, hydrochloric acid, phosphoric acid, citric acid, oxalic acid, or a mixture thereof, and carbon dioxide.

According to another embodiment, the surface-treated calcium carbonate comprises a treatment layer or surface coating obtained from the treatment with fatty acids, their salts, their esters, or combinations thereof, preferably from the treatment with aliphatic $C_5$ to $C_{28}$ fatty acids, their salts, their esters, or combinations thereof, and more preferably from the treatment with ammonium stearate, calcium stearate, stearic acid, palmitic acid, myristic acid, lauric acid, or mixtures thereof.

According to one embodiment of the present invention, the calcium-carbonate containing minerals comprise dolomite.

According to another embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

The at least one calcium carbonate containing filler may consist of only one type of calcium carbonate containing filler. Alternatively, the at least one calcium carbonate containing filler may consist of a mixture of two or more types of calcium carbonate containing fillers. According to a preferred embodiment of the present invention, the calcium carbonate containing filler is calcium carbonate. Preferably the calcium carbonate is ground calcium carbonate.

According to one embodiment of the present invention, the at least one calcium carbonate containing filler is in form of particles having a weight median particle size $d_{50}$ from 0.05 to 7 μm, preferably from 0.1 to 5 μm, more preferably from 0.2 to 3 μm, and most preferably from 0.3 to 2 μm.

According to another embodiment of the present invention, from 10 wt.-% to 100 wt.-% of the at least one calcium carbonate containing filler have a particle size of less than 2 μm, from 20 wt.-% to 99 wt.-% have a particles size of less than 1 μm, from 25 wt.-% to 95 wt.-% have a particle size of less than 0.5 μm, and from 30 wt.-% to 80 wt.-% have a particles size of less than 0.2 μm.

According to a further embodiment of the present invention, the at least one calcium carbonate containing filler is in form of particles having a top cut particle size $d_{98}$ of less than 0.1 μm, preferably less than 0.05 μm, and more preferably less than 0.01 μm.

The at least one calcium carbonate containing filler can be suspended in water, and thus, forms an aqueous suspension or slurry of the calcium carbonate containing filler. The obtained suspension can be ground under conditions such that autogenous grinding takes place and/or by horizontal ball milling, and/or other such processes known to the skilled man.

According to one embodiment of the present invention, the at least one calcium carbonate containing filler is in form of a suspension having a solids content of at least 1 wt.-%, preferably from 1 to 90 wt.-%, more preferably from 5 to 85 wt.-%, even more preferably from 20 to 80 wt.-%, and most preferably from 45 to 72 wt.-%, based on the total weight of the suspension. The suspension can be undispersed or dispersed, i.e. the suspension includes a dispersant.

According to another embodiment, the at least one calcium carbonate containing filler is provided in form of a moist filter cake, preferably having a solid content from 65 to 85 wt.-%, based on the total weight of the filter cake.

According to an exemplary embodiment, the at least one calcium carbonate containing filler is dispersed with a dispersant. The dispersant may be used in an amount from 0.01 to 10 wt.-%, 0.05 to 8 wt.-%, 0.5 to 5 wt.-%, 0.8 to 3 wt.-%, or 1.0 to 1.5 wt.-%, based on the total weight of the filler. In a preferred embodiment, the at least one calcium carbonate containing filler is dispersed with an amount of 0.05 to 5 wt.-%, and preferably with an amount of 0.5 to 5 wt.-% of a dispersant, based on the total weight of the filler. As suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The molecular weight $M_w$ of such products is preferably in the range of 2 000-15 000 g/mol, with a molecular weight $M_w$ of 3 000-7 000 g/mol being especially preferred. The molecular weight $M_w$ of such products is also preferably in the range of 2 000 to 150 000 g/mol, and an $M_w$ of 15 000 to 50 000 g/mol is especially preferred, e.g., 35 000 to 45 000 g/mol. According to an exemplary embodiment, the dispersant is polyacrylate.

Liquid Coating Composition

The liquid coating composition of the present invention comprises at least one terephthalate ionomer comprising anionic substituents selected from sulfonate, carboxylate and/or phosphate groups, wherein the at least terephthalate ionomer has an acid value of at least 1 mg KOH/g ionomer, at least one calcium carbonate containing filler, and a buffer, wherein the pH of the liquid coating composition is in the range from 6.5 to 11.

The at least one terephthalate ionomer may be present in the liquid coating composition in an amount from 1 to 50 wt.-%, preferably from 5 to 40 wt.-%, more preferably from 10 to 30 wt.-%, and most preferably from 15 to 25 wt.-%, based on the total weight of the liquid coating composition.

The at least one calcium carbonate containing filler may be present in the liquid coating composition in an amount from 1 to 80 wt.-%, preferably from 5 to 70 wt.-%, more preferably from 10 to 60 wt.-%, and most preferably from 20 to 50 wt.-%, based on the total weight of the liquid coating composition.

According to one embodiment of the present invention, the wt.-% ratio of the at least one terephthalate ionomer to the at least one calcium carbonate containing filler is in the range from 95:5 to 20:80, preferably 60:40 to 20:80, more preferably from 55:45 to 30:70, and most preferably from 50:50 to 45:65.

The liquid coating composition of the present invention contains a buffer so that the pH of the composition is in the range from pH 6.5 to 11. It is important to maintain the pH of the composition in said pH range since calcium carbonate containing fillers may be dissolved under acidic conditions. Suitable buffers are known to the skilled person and may comprise buffer agents as well as buffer systems containing two or more components. According to one embodiment of the present invention, the buffer is selected from 2-amino-2-methyl-1-propanol, 2-amino-1-butanol, 2-amino-2-ethyl-1,3-propanediol, 2-amino-2-methyl-1,3-propanediol, tris (hydroxymethyl)-aminomethane, monoisopropanolamine, sodium polyphosphate, potassium polyphosphate, ammonium polyphosphate, sodium phosphate, potassium phosphate, ammonium phosphate, sodium carbonate, potassium carbonate, ammonium carbonate, or mixtures thereof. Preferably, the buffer is 2-amino-2-methyl-1-propanol.

The liquid coating composition of the present invention may contain the at least one calcium carbonate containing filler as the only filler. Alternatively, the liquid coating composition of the present invention may contain the at least one calcium carbonate containing filler in combination with at least one additional filler. The additional filler can be made from inorganic or organic materials.

According to one embodiment of the present invention, the liquid coating composition further comprises at least one additional inorganic filler. Examples of suitable inorganic fillers comprise silica, alumina, titanium dioxide, clay, calcined clays, talc, kaolin, calcium sulfate, wollastonite, mica, bentonite, barium sulfate, gypsum, or zinc oxide. The liquid coating composition of the present invention may also comprise further additives.

According to one embodiment, the liquid coating composition further comprises a complexing agent. Examples of suitable complexing agents are polymeric zirconium compounds such as ammonium zirconium carbonate, or potassium zirconium carbonate. Preferably the complexing agent is ammonium zirconium carbonate. Without being bound to any theory, it is believed that the complexing agent can modify certain properties of the barrier coating formed from the liquid coating composition of the present invention. For example, adding a complexing agent to the liquid coating composition of the present invention may improve adhesion of the coating to the filler particles. Furthermore, the storage stability of the liquid coating composition can be improved by adding a complexing agent.

Additionally or alternatively, the liquid coating composition of the present invention may contain a coating binder. Any suitable polymeric binder may be used in the liquid coating composition of the invention. For example, the polymeric binder may be a hydrophilic polymer such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulfonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, or rhamsan and mixtures thereof. It is also possible to use other binders such as hydrophobic materials, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof.

According to one embodiment, the binder is a natural binder selected from starch. According to another embodiment, the binder is a synthetic binder selected from styrenebutadiene latex, styrene-acrylate latex, or polyvinyl acetate latex. According to a preferred embodiment of the present invention, the binder is polyvinyl alcohol. According to one embodiment of the present invention, the liquid coating composition comprises the binder in an amount from 0.1 to 10 wt.-%, based on the total weight of the filler, preferably from 0.5 to 5 wt.-%, and more preferably from 1 to 3 wt.-%.

Other optional additives that may be added to the liquid coating compositions are, for example, dispersants, milling aids, surfactants, rheology modifiers, lubricants, defoamers, optical brighteners, dyes, preservatives, or pH controlling agents. According to one embodiment, the coating layer further comprises a rheology modifier. Preferably the rheology modifier is present in an amount of less than 1 wt.-%, based on the total weight of the filler.

According to one embodiment of the present invention, the liquid coating composition is an aqueous composition, i.e. a composition containing water as the only solvent. According to another embodiment, the liquid coating composition is a non-aqueous composition. Suitable solvents are known to the skilled person and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to one embodiment of the present invention, the solids content of the liquid coating composition is in the range from 25 wt.-% to 75 wt.-%, preferably from 30 to 67 wt.-%, more preferably from 45 to 65 wt.-%, and most preferably from 50 to 62 wt.-%, based on the total weight of the composition. According to a preferred embodiment, the liquid coating composition is an aqueous composition having a solids content in the range from 25 wt.-% to 75 wt.-%, preferably from 30 to 67 wt.-%, more preferably from 45 to 65 wt.-%, and most preferably from 50 to 62 wt.-%, based on the total weight of the composition.

According to one embodiment of the present invention, the liquid coating composition has a Brookfield viscosity of between 10 and 4000 mPa·s at 20° C., preferably between 100 and 3500 mPa·s at 20° C., more preferably between 200 and 3000 mPa·s at 20° C., and most preferably between 250 and 2000 mPa·s at 20° C.

According to one preferred embodiment of the present invention, the liquid coating composition consists of at least one terephthalate ionomer comprising anionic substituents selected from sulfonate, carboxylate and/or phosphate groups, wherein the at least terephthalate ionomer has an acid value of at least 1 mg KOH/g ionomer, at least one calcium carbonate containing filler, and a buffer, wherein the pH of the liquid coating composition is in the range from 6.5 to 11. Preferably, the at least one ionomer is a sulfonated terephthalate ionomer. According to another preferred embodiment, the at least one ionomer is a polyethylene terephthalate ionomer, and more preferably a sulfonated polyethylene terephthalate ionomer.

According to another preferred embodiment of the present invention, the liquid coating composition comprises at least one terephthalate ionomer, preferably at least one polyethylene terephthalate ionomer, comprising anionic substituents selected from sulfonate, carboxylate and/or phosphate groups, wherein the at least terephthalate ionomer has an acid value of at least 1 mg KOH/g ionomer, at least one calcium carbonate containing filler, a buffer, wherein the pH of the liquid coating composition is in the range from 6.5 to 11, and a complexing agent. Preferably, the at least one terephthalate ionomer is a sulfonated terephthalate ionomer, more preferably a sulfonated polyethylene terephthalate ionomer and/or the buffer is 2-amino-2-methyl-1-propanol and/or the complexing agent is ammonium zirconium carbonate.

According to one aspect of the present invention, a process for producing a liquid coating composition is provided, comprising the steps of:
 a) providing an aqueous solution and/or dispersion of at least one terephthalate ionomer comprising anionic substituents selected from sulfonate, carboxylate and/or phosphate groups, wherein the at least one terephthalate ionomer has an acid value of at least 1 mg KOH/g ionomer,
 b) providing at least one calcium carbonate containing filler,
 c) mixing the aqueous solution and/or dispersion of the at least one terephthalate ionomer of step a) and the at least one calcium carbonate containing filler of step b), wherein a buffer is added
   (i) during step a), or
   (ii) during steps a) and b), or
   (iii) during steps a) and c), or
   (iv) during steps a), b) and c)
to provide in the obtained liquid coating composition a pH in the range from 6.5 to 11.

The aqueous solution and/or dispersion of the at least one terephthalate ionomer provided in step a) can be prepared by adding the ionomer to water and heating the obtained mixture under stirring conditions until the polymer is dissolved or dispersed. According to one exemplary embodiment, the ionomer/water mixture is heated up to 95° C. for 60 min. If necessary, an anti-foam agent can be added.

According to one embodiment of the present invention, the aqueous solution and/or dispersion of the at least one terephthalate ionomer has a solids content from 1 to 70 wt.-%, preferably from 5 to 60 wt.-%, more preferably from 10 to 50 wt.-%, and most preferably from 20 to 45 wt.-%, based on the total weight of the solution.

The at least one calcium carbonate containing filler provided in step b) can be in solid form or in form of a suspension. According to one embodiment, the at least one calcium carbonate containing filler provided in step b) is in form of a filter cake, preferably having a solids content of more than 75 wt.-%, based on the total weight of the filter cake. According to another embodiment, the at least one calcium carbonate containing filler of step b) is provided in form of a suspension, preferably a dispersed suspension. The suspension of the calcium carbonate containing filler can have a solids content of at least 1 wt.-%, preferably from 1 to 90 wt.-%, more preferably from 5 to 85 wt.-%, even more preferably from 20 to 75 wt.-%, and most preferably from 45 to 65 wt.-%, based on the total weight of the suspension.

The mixing of process step c) can be carried out by any method known in the art, and the skilled person will adapt the mixing conditions such as the mixing speed and temperature according to his process equipment. For example, the mixing may take place by means of a plowshare mixer. Plowshare mixers function by the principle of a fluidized bed produced mechanically. Plowshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany, or from Silverson, U.S.A. Furthermore, a tubular mixing apparatus, for example, from Ystral GmbH, Ballrechten-Dottingen, Germany may be used. Other equipment that may be used in the inventive process is a MEGATRON® Inline homogenizer from Kinematika AG, Switzerland.

The process step c) may be carried out at room temperature, i.e. at a temperature of 20° C.±2° C., or at other temperatures. According to one embodiment the process step c) is carried out at a temperature from 5 to 140° C., preferably from 10 to 110° C., and most preferably from 20 to 105° C. Heat may be introduced by internal shear or by an external source or a combination thereof.

According to one embodiment of the present invention, process step c) is carried out for at least 1 s, preferably for at least 1 min, e.g., for at least 15 min, 30 min, 1 hour, 2 hours, 4 hours, 6 hours, 8 hours, or 10 hours.

To ensure a better dispersion, a dispersant may also be added to any of the components used in the inventive process, e.g., in the form of an aqueous solution and/or a powder of a dispersant. According to one embodiment of the present invention, the process further comprises the step of adding a dispersant before, during and/or after step c). A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2000 to 15000 g/mol, with a weight average molecular weight $M_w$ from 3000 to 7000 g/mol or 3500 to 6000 g/mol being especially preferred. According to an exemplary embodiment, the dispersant is sodium polyacrylate having a weight average molecular weight $M_w$ from 2000 to 15000 g/mol, preferably from 3000 to 7000 g/mol, and most preferably from 3500 to 6000 g/mol.

The mixing step may be carried out at a solid content is in the range from 25 wt.-% to 75 wt.-%, preferably from 30 to 67 wt.-%, more preferably from 45 to 65 wt.-%, and most preferably from 50 to 62 wt.-%, based on the total weight of the liquid coating composition. However, the mixing step can also be carried out at a solid content of more than 75 wt.-%, based on the total weight of the liquid coating composition, e.g. by using a plowshare mixer.

The solids content of the liquid coating composition can be adjusted by the methods known to the skilled person. For example, the liquid coating composition may be partially or fully dewatered by a filtration, centrifugation or thermal separation process. For example, the liquid coating composition may be partially or fully dewatered by a filtration process such as nanofiltration or a thermal separation process such as an evaporation process. Alternatively, water and/or a solvent may be added to the liquid coating composition until the desired solids content is obtained.

According to one embodiment, the liquid coating composition is in form of a filter cake, preferably having a solids content of more than 75 wt.-%, based on the total weight of the filter cake.

According to one embodiment of the present invention, the process further comprises the step of adding a complexing agent before, during and/or after step c). Preferably, in a first step the complexing agent is added to the at least one calcium carbonate containing filler provided in step b), and then, in a second step, the aqueous solution and/or dispersion of the at least one terephthalate ionomer is added to the obtained mixture.

Additionally or alternatively, an additional filler can be added before, during and/or after step c). Preferably, in a first step the additional filler is mixed with the at least one calcium carbonate containing filler provided in step b), and then, in a second step, the aqueous solution and/or dispersion of the at least one terephthalate ionomer is added to the obtained mixture.

Other suitable additives such as those described above, can also be added before, during and/or after step c).

According to one aspect of the present invention, the use of a composition comprising at least one terephthalate ionomer and at least one calcium carbonate containing filler as a barrier layer for packaging materials is provided, wherein the at least one terephthalate ionomer comprises anionic substituents selected from sulfonate, carboxylate and/or phosphate groups, and the at least one polyethylene terephthalate ionomer has an acid value of at least 1 mg KOH/g ionomer. The barrier layer may prevent migration of hydrophobic substances such as mineral oils, plasticizers, and/or hydrophobic contaminants such as bisphenol A (BPA), bis (2-ethylhexyl) phthalate (DEHP), nonylphenol monoethoxylate (NMP), or nonylphenol diethoxilate (NDP), for example, from a packaging material which is covered by the barrier layer.

According to a preferred embodiment of the present invention, the use of a composition comprising at least one terephthalate ionomer and at least one calcium carbonate containing filler as a barrier layer for packaging materials is provided, wherein the at least one terephthalate ionomer comprises anionic substituents selected from sulfonate, carboxylate and/or phosphate groups, and the at least one polyethylene terephthalate ionomer has an acid value of at least 1 mg KOH/g ionomer, and wherein the barrier layer constitutes a barrier for hydrophobic substances. According to one embodiment, the hydrophobic substances comprise mineral oils, plasticizers, hydrophobic contaminants, bisphenol A (BPA), bis (2-ethylhexyl) phthalate (DEHP), nonylphenol monoethoxylate (NMP), nonylphenol diethoxilate (NDP), or mixtures thereof.

Packaging Material

According to the present invention, a packaging material is provided comprising
- a cellulose-based substrate having a first and a reverse side, and
- at least one barrier layer being in contact with the first side or the reverse side of the substrate,
- wherein the at least one barrier layer comprises at least one terephthalate ionomer and at least one calcium carbonate containing filler, and
- wherein the at least one terephthalate ionomer comprises anionic substituents selected from sulfonate, carboxylate and/or phosphate groups and has an acid value of at least 1 mg KOH/g ionomer.

According to a preferred embodiment, the packaging material is a food packaging material and/or a food display. Examples of food packaging materials are fast food wrappers, food bags, snack bags, grocery bags, ovenable food containers, cups, trays, cartons, or boxes.

The cellulose-based substrate comprises at least 50 wt.-% cellulose material, preferably at least 75 wt.-%, more preferably at least 90 wt.-%, and most preferably at least 95 wt.-%, based on the total weight of the substrate. Suitable cellulose materials are, for example, wood pulp, straw, cotton, bagasse, and the like. The cellulose-based substrate can be made, for example, from a natural pulp, a recycled pulp, a synthetic pulp, or the like and mixtures thereof. If necessary, various additives such as sizing agents, paper-strength enhancers, fillers, antistatic agents, fluorescent whitening agents, or dyes can be added during the production of the cellulose-based substrate.

According to one embodiment of the present invention, the cellulose-based substrate is selected from paper, cardboard, or containerboard. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board. The paper, cardboard, or containerboard substrate can have a basis weight from 10 to 1000 g/m$^2$, from 20 to 800 g/m$^2$, from 30 to 700 g/m$^2$, or from 50 to 600 g/m$^2$.

The cellulose-based substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers. Preferably the sublayers of the substrate are made from paper, cardboard and/or containerboard.

According to one exemplary embodiment, the cellulose-based substrate is structured by two sublayers comprising a flat sublayer and a sublayer having a non-flat structure, e.g. a corrugated structure. According to another exemplary embodiment, the substrate is structured by three sublayers comprising two flat outer sublayers and an intermediate sublayer having a non-flat structure, e.g. a corrugated structure. According to another exemplary embodiment, the cellulose-based substrate is structured by five sublayers comprising two flat outer sublayers, a flat intermediate sublayer, and between the outer sublayer and the intermediate sublayer two sublayers having a non-flat structure, e.g. a corrugated structure. According to still another embodiment, the substrate is structured by seven sublayers comprising two flat outer sublayers, two flat intermediate sublayers, and three sublayers having a non-flat structure, e.g. a corrugated structure, wherein two non-flat sublayers are between the outer sublayer and the intermediate sublayers, and one non-flat sublayer is between the two intermediate sublayers. However, the substrate according to the present invention may also comprise any other suitable single or multilayer structure.

The cellulose-based substrate can be uncoated or pre-coated. For example, the cellulose-based substrate may be pre-coated with a surfaces sizing agent, a surface paper-strength enhancer, a fluorescent whitening agent, an antistatic agent, a dye, an anchoring agent and the like. The cellulose-based substrate can also be printed. Preferably, the cellulose-based substrate is uncoated and/or blank.

The cellulose-based substrate can have a thickness from 1 μm to 10 mm, from 10 μm to 5 mm, from 50 μm to 1000 μm, or from 100 to 500 μm.

According to one embodiment of the present invention, the packaging material comprises two barrier layers, wherein the first barrier layer is in contact with the first side of the substrate and the second barrier layer is in contact with the reverse side of the substrate.

According to one embodiment of the present invention, the at least one barrier layer is present in an amount from 1 to 40 g/m$^2$, preferably from 5 to 30 g/m$^2$, and more preferably in an amount from 7 to 25 g/m$^2$.

The packaging material of the present invention may also comprise more than one barrier layer on the first and/or reverse side of the cellulose-based substrate. For example, the packaging material of the present invention comprises at least two, at least three or at least four barrier layers on the first and/or the reverse side of the cellulose-based substrate. Said barrier layers may have the same composition or different compositions.

According to another aspect of the present invention a process for producing a packaging material is provided, the process comprising the following steps:
A) providing a cellulose-based substrate having a first and a reverse side,
B) applying a liquid coating composition on the first side of the substrate to form a barrier layer, and
C) drying the barrier layer,
wherein the liquid coating composition comprises at least one terephthalate ionomer comprising anionic substituents selected from sulfonate, carboxylate and/or phosphate groups, wherein the at least terephthalate ionomer has an acid value of at least 1 mg KOH/g ionomer, at least one calcium carbonate containing filler, and a buffer, wherein the pH of the liquid coating composition is in the range from 6.5 to 11.

According to one embodiment, process steps B) and C) are also carried out on the reverse side of the substrate to manufacture a packaging material being coated on the first and the reverse side. These steps may be carried out for each side separately or may be carried out on the first and the reverse side simultaneously.

According to one embodiment of the present invention, process steps B) and C) are carried out two or more times using a different or the same liquid coating composition.

The liquid coating composition may be applied onto the cellulose-based substrate by conventional coating means commonly used in this art. Suitable coating methods are, e.g., air knife coating, electrostatic coating, metering size press, film coating, spray coating, wound wire rod coating, slot coating, slide hopper coating, gravure, curtain coating, high speed coating and the like. Some of these methods allow for simultaneous coatings of two or more layers, which is preferred from a manufacturing economic perspective. However, any other coating method which would be suitable to form a barrier layer on the cellulose-based substrate may also be used. According to an exemplary embodiment, the liquid coating composition is applied by high speed coating, metering size press, curtain coating, spray coating, flexo and gravure, or blade coating, preferably curtain coating.

According to step C), the barrier layer formed on the cellulose-based substrate is dried. The drying can be carried out by any method known in the art, and the skilled person will adapt the drying conditions such as the temperature according to his process equipment. For example, the barrier layer can be dried by infrared drying and/or convection drying. The drying step may be carried out at room temperature, i.e. at a temperature of 20° C.±2° C. or at other temperatures. According to one embodiment, process step C) is carried out at substrate surface temperature from 25 to 150° C., preferably from 50 to 140° C., and more preferably from 75 to 130° C.

After coating, the packaging material may be subject to calendering or super-calendering to enhance surface smoothness. For example, calendering may be carried out at a temperature from 20 to 200° C., preferably from 60 to 100° C. using, for example, a calender having 2 to 12 nips. Said nips may be hard or soft, hard nips, for example, can be made of a ceramic material. According to one exemplary embodiment, the packaging material is calendered at 300 kN/m to obtain a glossy coating. According to another exemplary embodiment, the packaging material is calendered at 120 kN/m to obtain a matt coating.

According to a further aspect of the present invention, a packaging material obtainable by the process according to the present invention is provided.

The barrier layer of the present invention can prevent the migration of hydrophobic substances such as mineral oils, plasticizers and/or hydrophobic contaminants, which may be present in the cellulose-based substrates, into materials being in contact with the barrier layer. In addition, the barrier layer may be moisture-resistant.

Furthermore, the inventive liquid coating composition and the inventive barrier coated packaging material have certain advantages compared to the conventionally barrier coatings. The liquid coating composition of the present invention can be applied to the cellulose-based substrate with a high solids content, for example, with a solids content of 25 wt.-% or more, and can include a high amount of calcium carbonate containing filler. This can decrease the drying time of the applied barrier layer, which in turn can lower the energy consumption and reduces the time, in which the substrate is in contact with the wet coating composition, which may affect the structure of the substrate. Due to the shorter drying times, the inventive process for producing a packaging material can also be carried out on conventional production units and does not require any specific modifications. Moreover, the use of polymeric material is reduced, which can lower the production costs and improves the environmental sustainability and recyclability of the barrier layer. Furthermore, the inventive coating composition does not affect the quality of the packaging material. Without being bound to any theory it is believed that the anionic groups of the PET ionomer can strongly interact with the calcium carbonate containing filler, which leads to a densely packed layer, wherein the PET ionomers are incorporated into a matrix of the calcium carbonate containing filler particles.

According to another aspect of the present invention, the use of a packaging material according to the present invention in food packaging applications and/or food displays is provided. Examples of food packaging are fast food wrappers, food bags, snack bags, grocery bags, ovenable food containers, cups, trays, cartons, or boxes. According to one embodiment, the packaging material is selected from the group consisting of fast food wrappers, food bags, snack bags, grocery bags, ovenable food containers, cups, trays, cartons, boxes, folding boxes, corrugated board, carton, or laminated papers.

The scope and interest of the present invention will be better understood based on the following FIGURES and examples which are intended to illustrate certain embodiments of the present invention and are non-limitative.

DESCRIPTION OF THE FIGURE

FIG. 1 shows a graph of the hexane migration through comparative and inventive packaging materials over 24 hours.

EXAMPLES

1. Measurement Methods

In the following, measurement methods implemented in the examples are described.

Brookfield Viscosity

The Brookfield viscosity of the liquid coating compositions was measured after one hour of production and after one minute of stirring at 20° C.±2° C. at 100 rpm by the use of a Brookfield viscometer type RVT equipped with an appropriate disc spindle, for example spindle 2 to 5.

pH Value

The pH of a suspension or solution was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Sigma-Aldrich Corp., USA). The reported pH values are the endpoint values detected by the instrument (the endpoint was when the measured signal differed by less than 0.1 mV from the average over the last 6 seconds).

Particle Size Distribution

The particle size distribution of the pigment particles was measured using a Sedigraph 5100 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Barrier Performance Quick Test

A droplet of 15 µl hexane, which has been red-colored with sudan red, was applied for 30 s to the barrier side of the substrate. The appearance of red stains on the reverse side of the barrier paper indicated a migration of hexane through the barrier coated substrate.

Barrier Performance Migration Test—Hexane Vapor Transmission Rate 10 g hexane was added into a migration cell, which was sealed by a coated substrate sample. The sealed migration cell was placed on an automatic balance and the weight of the migration cell was registered every 30 min for 24 h. A decrease in weight indicated a migration of hexane through the barrier coating. As a reference a migration cell sealed with an aluminum foil was used, which did not show any weight decrease over 24 h.

Degree of Sulfonation

The amount of sulfonate groups was determined by measuring the amount of sulfur in the ionomer using a CHNS elementary analysis. For the elementary analysis a Vario EL III CHNS elemental analyzer from Elementar Analysensysteme GmbH, Germany, was used.

2. Materials

Ionomer

PET1: sulfonated polyethylene terephthalate ionomer (acid value: <10 KOH mg/g ionomer; intrinsic viscosity: 0.40-0.46, degree of sulfonation: 3.5-3.7 wt.-%, based on the total weight of PET1), commercially available from The Seydel Companies, Inc. (USA).

Calcium Carbonate Containing Filler

CC1: ground calcium carbonate ($d_{50}$: 0.6 µm), commercially available from Omya International AG, Switzerland.

CC2: pre-dispersed slurry of ground calcium carbonate ($d_{50}$: 0.6 µm, solids content: 71.5 wt.-%, pH: 10, Brookfield viscosity: 300 mPa·s at 20° C.), commercially available from Omya International AG, Switzerland.

CC3: pre-dispersed slurry of ground calcium carbonate ($d_{50}$: 0.5 µm, solids content: 72 wt.-%, pH: 10, Brookfield viscosity: 500 mPa·s at 20° C.), commercially available from Omya International AG, Switzerland.

Buffer

AMP: 2-amino-2-methyl-1-propanol solution, commercially available from Angus Chemical Company, USA.

Complexing Agent

AZC: ammonium zirconium carbonate, commercially available from Clariant SE, Switzerland.

Binder

PVA1: polyvinyl alcohol Mowiol 26-88, commercially available from Kuraray Europe GmbH, Germany.

PVA2: polyvinyl alcohol Mowiol 18-88, commercially available from Kuraray Europe GmbH, Germany.

Other Additives

Surfactant: Tecside 87, available from Trill) Emulsion Chemie AG, Ramsen, Switzerland.

Thickener: Sterocoll DF, available from BASF.

3. Examples

Example 1

Solubilization of Sulfonated PET Ionomer

Water was placed into a beaker and under continuous stirring with a paddle mixer, terephthalate ionomer PET1 was added in an amount of 30-50 wt.-%, based on the total weight of the aqueous solution. Subsequently, the mixture was heated up to 90° C. for 30 min. The obtained solution was cooled down to 40 to 50° C. and then the pH was adjusted to 8.5 by adding buffer AMP.

The obtained aqueous solution of PET1 was yellow honey colored and had a solids content of 30 wt.-%, based on the total weight of the aqueous solution, and a viscosity of less than 50 mPa·s.

Preparation of Liquid Coating Compositions

The filler CC1 was provided in form of a filter cake having a solids content of 78 wt.-%, based on the total weight of the filter cake. The filter cake was mixed with 0.3 parts by weight of complexing agent AZC. Subsequently, the aqueous solution of PET1 was added in such an amount that a wt.-% ratio of filler to PET1 of 62 to 38 was obtained.

The obtained liquid coating composition had a solids content of 48 wt.-%, based on the total weight of the composition, a pH of 8.5 and a viscosity of 200 mPa·s.

Preparation of Barrier Coated Substrates

Virgin cellulose-based substrates of the UZ (uncoated, bleached virgin chemical pulp) or UC (uncoated, virgin mechanical pulp) type with a basis weight of 260 g/m² (e.g. available from SAPPI, Maastricht, The Netherlands) were coated with the prepared inventive coating composition (composition B) and a comparative coating composition (composition A), which was the prepared solution of PET1. The coating was carried out with a K303 Control Coater, Model 625, from Erichsen, Germany, using the amounts, rods and speeds indicated in Table 2 below. Unlike the inventive coating composition samples, barrier coatings prepared with coating composition A (comparative example) required a long time for drying.

TABLE 1

Liquid coating compositions.

| Coating composition | Filler | Polymer | Ratio filler/polymer [wt.-%/wt.-%] | Solids content [wt.-%] |
|---|---|---|---|---|
| A (comparative) | — | PET1 | — | 30 |
| B (inventive) | CC1 | PET1 | 62:38 | 48 |

TABLE 2

Composition of coated substrates

| Sample | Coating composition | Amount of applied coating composition [g/m²] | Rod/Speed |
|---|---|---|---|
| 1 | B (inventive) | 10 | 3/2 |
| 2 | B (inventive) | 15 | 4/2 |
| 3 | B (inventive) | 20 | 4/10 |
| 4 | B (inventive) | 6 | 0/2 |
| 5 | A (comparative) | 10 | 3/2 |
| 6 | A (comparative) | 5 | 0/2 |

The barrier performance of the barrier coated substrate samples 1 to 6 and a blank substrate sample, was tested by determining the hexane vapor transmission rate using the barrier performance migration test, described above. The test results are shown in FIG. 1, wherein the numbers in the FIGURE correspond to the sample numbers.

It can be seen from FIG. 1 that the blank substrate sample showed a bad barrier performance: the hexane was totally migrated through the barrier coating after 14 to 16 h. All substrates coated with inventive coating composition (composition B) revealed good barrier properties. The substrate coated with PET1 only (composition A) revealed also good barrier properties. However, as already mentioned above, barrier coatings containing PET1 only required long drying times, which can have a negative effect on the substrate and may delay production processes.

Example 2

Two liquid coating composition samples 7 and 8 were produced, using the ingredients and amounts compiled in Table 3 below, as follows:

An aqueous solution of PET1 having a solids content of 36.3 wt.-%, based on the total weight of the solution, was prepared by mixing the respective amount of PET1 with water and stirring the mixture 60 min at 95° C.

The calcium carbonate suspension CC3 was mixed with the prepared aqueous solution of PET1. The obtained mixture was buffered with buffer AMP to a pH value of 8.5, and subsequently, the additive PVA1 was added under mixing conditions. The properties of the obtained liquid coating composition are given in Table 3 below.

The liquid coating composition was applied on a white lined chipboard GD2 (Kondor-GD 2, Buchmann Karton, Germany) in an amount such that a layer thickness as indicated in Table 3 below was achieved and by using a rod no. 3 and a K303 Control Coater, Model 625, from Erichsen, Germany. After application of the barrier layer, the chipboard had the moisture content given in Table 3 below. The applied coating composition was dried at room temperature under infrared light for 5 seconds.

TABLE 3

Composition and properties of coating composition samples 7 and 8 and the barrier layers produced thereof.

| | Component | Sample 7 | Sample 8 |
|---|---|---|---|
| PET1 | parts by weight of solution | 110.34 | 137.93 |
| | solid content [wt.-%] | 36.3 | 36.3 |
| | parts by weight, based on dry coating composition | 40 | 50 |
| CC3 | parts by weight of suspension | 83.22 | 69.93 |
| | solid content [wt.-%] | 72 | 72 |
| | parts by weight, based on dry coating composition | 60 | 50 |
| PVA1 | parts by weight of solution | 5.71 | 5.71 |
| | solid content [wt.-%] | 17.5 | 17.5 |
| | parts by weight, based on dry coating composition | 1 | 1 |
| Properties of obtained coating composition | solids content [wt.-%] | 50.7 | 47.6 |
| | pH | 9.0 | 8.95 |
| | viscosity [mPa · s] | 750 | 280 |
| Properties of barrier layer | layer weight per unit area [g/m$^2$] | 18.9 | 18.9 |
| | moisture content of substrate [%] | 5.6 | 6.2 |

The barrier performance of the coated chipboards was tested using the barrier performance quick test described above. The cardboard remained white, and thus, the applied coating composition showed good barrier properties.

Example 3

Two liquid coating composition samples 9 and 10 were produced, using the ingredients and amounts compiled in Table 4 below, as follows:

An aqueous solution of PET1 having a solids content of 36.3 wt.-%, based on the total weight of the solution, was prepared by mixing the respective amount of PET1 with water and stirring the mixture 60 min at 95° C. The obtained PET1 solution was buffered with buffer AMP to a pH value of 8.5.

The calcium carbonate suspension CC2 was pre-mixed with 0.28 wt.-%, based on the total weight of the dried coating composition, of the complexing agent AZC and 4 parts by weight, based on the dry coating composition, (corresponding to 11.03 parts by weight of the PET1 solution) of the prepared aqueous solution of PET1. The pre-mixed calcium carbonate suspension was buffered with buffer AMP to a value of 8.5 and mixed with the remaining parts of said aqueous solution of PET1. Subsequently, additive PVA1 was added under mixing conditions. The properties of the obtained liquid coating composition are also given in Table 4 below.

The liquid coating composition was applied on a white lined chipboard GD2 (Kondor-GD 2, Buchmann Karton, Germany) in an amount such that a layer thickness as indicated in Table 4 below was achieved and by using a rod no. 3 and a K303 Control Coater, Model 625, from Erichsen, Germany. After application of the barrier layer, the chipboard had the moisture content given in Table 4 below. The applied coating composition was dried at room temperature under infrared light for 5 seconds.

TABLE 4

Composition and properties of coating composition samples 9 and 10 and the barrier layers produced thereof.

| | Component | Sample 9 | Sample 10 |
|---|---|---|---|
| PET1 | parts by weight of solution | 110.34 | 137.93 |
| | solid content [wt.-%] | 36.3 | 36.3 |
| | parts by weight, based on dry coating composition | 40 | 50 |
| CC2 | parts by weight of suspension | 83.92 | 69.93 |
| | solid content [wt.-%] | 71.5 | 71.5 |
| | parts by weight, based on dry coating composition | 60 | 50 |
| PVA1 | parts by weight of solution | 5.71 | 5.71 |
| | solid content [wt.-%] | 17.5 | 17.5 |
| | parts by weight, based on dry coating composition | 1 | 1 |
| Properties of obtained coating composition | solids content [wt.-%] | 51.3 | 47 |
| | pH | 8.77 | 8.75 |
| | viscosity [mPa · s] | 280 | 320 |
| Properties of barrier layer | layer weight per unit area [g/m$^2$] | 16.5 | 16.0 |
| | moisture content of substrate [%] | 6.0 | 6.2 |

The barrier performance of the coated chipboards was tested using the barrier performance quick test described above. The cardboard remained white, and thus, the applied coating composition showed good barrier properties.

Example 4

Two liquid coating composition samples 11 and 12 were produced, using the ingredients and amounts compiled in Table 5 below, as follows:

An aqueous solution of PET1 having a solids content of 41.1 wt.-%, based on the total weight of the solution, was prepared by mixing the respective amount of PET1 with water and stirring the mixture 60 min at 95° C. The obtained PET1 solution was buffered with buffer AMP to a pH value of 8.5.

The calcium carbonate suspension CC2 or CC3, respectively, was pre-mixed with the complexing agent AZC, 0.2 wt.-%, based on the total weight of the dried coating composition, of buffer AMP, and 2 parts by weight, based on the dry coating composition, (corresponding to 4.83 parts by weight of the PET1 solution) of the prepared aqueous solution of PET1. Subsequently, the pre-mixed calcium carbonate suspension was mixed with the remaining parts of the aqueous solution of PET1. The properties of the obtained liquid coating composition are also given in Table 5 below.

The liquid coating composition was applied on a white lined chipboard GD2 (Kondor-GD 2, Buchmann Karton, Germany) in an amount such that a layer thickness as indicated in Table 5 below was achieved and by using a rod no. 3 and a K303 Control Coater, Model 625, from Erichsen, Germany. After application of the barrier layer, the chipboard had the moisture content given in Table 5 below. The applied coating composition was dried at room temperature under infrared light for 5 seconds.

TABLE 5

Composition and properties of coating composition samples 11 and 12 and the barrier layers produced thereof.

| | Component | Sample 11 | Sample 12 |
|---|---|---|---|
| PET1 | parts by weight of solution | 72.46 | 72.46 |
| | solid content [wt.-%] | 41.4 | 41.4 |
| | parts by weight, based on dry coating composition | 30 | 30 |

TABLE 5-continued

Composition and properties of coating composition samples 11 and 12 and the barrier layers produced thereof.

| | Component | Sample 11 | Sample 12 |
|---|---|---|---|
| CC3 | parts by weight of suspension | 94.59 | — |
| | solid content [wt.-%] | 74.0 | — |
| | parts by weight, based on dry coating composition | 70 | — |
| CC2 | parts by weight of suspension | — | 94.59 |
| | solid content [wt.-%] | — | 74.0 |
| | parts by weight, based on dry coating composition | — | 70 |
| Properties of obtained coating composition | solids content [wt.-%] | 59.0 | 59.4 |
| | pH | 8.45 | 8.40 |
| | viscosity [mPa · s] | 1760 | 3270 |
| Properties of barrier layer | layer weight per unit area [g/m$^2$] | 22.0 | 14.0 |
| | moisture content of substrate [%] | 6.5 | 6.8 |

The barrier performance of the coated chipboards was tested using the barrier performance quick test described above. The cardboard remained white, and thus, the applied coating composition showed good barrier properties.

Example 5

Mill Trial

This example illustrates the preparation of coated substrates by use of slide die curtain coating technology in industrial scale.

The base paper used in this trial was a test liner from Model AG, Weinfelden, Switzerland with a grammage of 135 g/m$^2$.

A liquid coating composition sample 13 was produced, using the ingredients and amounts compiled in Table 5 below, as follows:

An aqueous solution of PET1 having a solids content of 30.0 wt.-%, based on the total weight of the solution, was prepared by mixing the respective amount of PET1 with water and stirring the mixture 60 min at 95° C. The obtained PET1 solution was buffered with buffer AMP to a pH value of 8.5.

The calcium carbonate suspension CC3 was mixed with the prepared aqueous solution of PET1. The obtained mixture was buffered with buffer AMP to a pH value of 8.5, and subsequently, the additive PVA2 as well as the surfactant and the thickener were added under mixing conditions. The properties of the obtained liquid coating composition are given in Table 5 below.

TABLE 5

Composition and properties of coating composition sample 13

| | Component | Sample 13 |
|---|---|---|
| PET1 | solid content [wt.-%] | 30.0 |
| | parts by weight, based on dry coating composition | 50 |
| CC3 | solid content [wt.-%] | 72.0 |
| | parts by weight, based on dry coating composition | 50 |
| PVA2 | solid content [wt.-%] | 13.0 |
| | parts by weight, based on dry coating composition | 3 |
| Surfactant (Tecside 87) | solid content [wt.-%] | 100 |
| | parts by weight, based on dry coating composition | 0.7 |

TABLE 5-continued

Composition and properties of coating composition sample 13

| | Component | Sample 13 |
|---|---|---|
| Thickener (Sterocoll ® DF) | solid content [wt.-%] | 50 |
| | parts by weight, based on dry coating composition | 0.02 |
| Properties of obtained coating composition | solids content [wt.-%] | 39.0 |
| | Surface tension [mN/m] | 35 |
| | viscosity [mPa · s] | 150 |

The static surface tension has been analyzed with a tensiometer from the company Krüss GmbH, Hamburg, Germany.

The curtain coating trial was conducted on a coating machine 5, at the Cham Paper Group, Cham, Switzerland.

Two coating trials were run, one with a machine speed of 300 m/min and an application weight of 10 g/m$^2$, and a second one with a machine speed of 300 m/min and an application weight of 15 g/m$^2$.

The applied coating was dried using hot air and infra-red light.

Migration tests, namely MOSH (migration of mineral oil saturated hydrocarbons) and MOAH (migration of mineral oil aromatic hydrocarbons), have been conducted over 50 days on both samples (10 g/m$^2$ and 15 g/m$^2$ coating weight) by Eurofins Scientific AG, Switzerland, an external testing lab, according to DIN EN 14338:2004.

The results are as follows:

Both coating weights showed even after 50 days a MOSH value (sum of all saturated hydrocarbons with C10 to C35 chain) of less than 0.6 mg/kg, and a MOAH value (sum of all aromatic hydrocarbons with 10 to 35 C-atoms) of less than 0.15 mg/kg.

The invention claimed is:

1. A liquid coating composition comprising
   at least one terephthalate ionomer comprising anionic substituents selected from sulfonate, carboxylate and/or phosphate groups, wherein the at least one terephthalate ionomer has an acid value of at least 1 mg KOH/g ionomer,
   at least one calcium carbonate containing filler, and a buffer,
   wherein the pH of the liquid coating composition is in the range from 6.5 to 11.

2. The composition of claim 1, wherein the at least one terephthalate ionomer comprises the anionic substituents in an amount from 0.1 to 20 mol-%, based on the total amount of the at least one ionomer.

3. The composition of claim 1, wherein the at least one terephthalate ionomer comprises the anionic substituents in an amount from 0.5 to 10 mol-%, based on the total amount of the at least one ionomer.

4. The composition of claim 1, wherein the at least one terephthalate ionomer comprises the anionic substituents in an amount from 1 to 5 mol-%, based on the total amount of the at least one ionomer.

5. The composition of claim 1, wherein the at least one terephthalate ionomer is a sulfonated terephthalate ionomer.

6. The composition of claim 1, wherein the at least one terephthalate ionomer is a sulfonated terephthalate ionomer comprising sulfonate groups in an amount from 0.1 to 6 wt.-%, based on the total weight of the at least one ionomer.

7. The composition of claim 1, wherein the at least one terephthalate ionomer is a sulfonated terephthalate ionomer comprising sulfonate groups in an amount from 1 to 5 wt.-%, based on the total weight of the at least one ionomer.

8. The composition of claim 1, wherein the at least one terephthalate ionomer is a sulfonated terephthalate ionomer comprising sulfonate groups in an amount from 2 to 4 wt.-%, based on the total weight of the at least one ionomer.

9. The composition of claim 1, wherein the at least one calcium carbonate containing filler is selected from the group consisting of calcium carbonate, calcium carbonate containing minerals, and mixtures thereof.

10. The composition of claim 1, wherein the at least one calcium carbonate containing filler is calcium carbonate.

11. The composition of claim 1, wherein the at least one calcium carbonate containing filler is ground calcium carbonate.

12. The composition of claim 1, wherein the at least one calcium carbonate containing filler is in a form of particles having a weight median particle size d50 from 0.05 to 7 µm.

13. The composition of claim 1, wherein the at least one calcium carbonate containing filler is in a form of particles having a weight median particle size d50 from 0.1 to 5 µm.

14. The composition of claim 1, wherein the at least one calcium carbonate containing filler is in a form of particles having a weight median particle size d50 from 0.2 to 3 µm.

15. The composition of claim 1, wherein the at least one calcium carbonate containing filler is in a form of particles having a weight median particle size d50 from 0.3 to 2 µm.

16. The composition of claim 1, wherein the composition has a solids content is in the range from 25 wt.-% to 75 wt.-%, based on the total weight of the composition.

17. The composition of claim 1, wherein the composition has a solids content is in the range from 30 wt.-% to 67 wt.-%, based on the total weight of the composition.

18. The composition of claim 1, wherein the composition has a solids content is in the range from 45 wt.-% to 65 wt.-%, based on the total weight of the composition.

19. The composition of claim 1, wherein the composition has a solids content is in the range from 50 wt.-% to 62 wt.-%, based on the total weight of the composition.

20. The composition of claim 1, wherein the wt.-% ratio of the at least one terephthalate ionomer to the at least one calcium carbonate containing filler is in the range from 95:5 to 20:80.

21. The composition of claim 1, wherein the wt.-% ratio of the at least one terephthalate ionomer to the at least one calcium carbonate containing filler is in the range from 60:40 to 20:80.

22. The composition of claim 1, wherein the wt.-% ratio of the at least one terephthalate ionomer to the at least one calcium carbonate containing filler is in the range from 55:45 to 30:70.

23. The composition of claim 1, wherein the wt.-% ratio of the at least one terephthalate ionomer to the at least one calcium carbonate containing filler is in the range from 50:50 to 45:65.

24. The composition of claim 1, wherein the composition further comprises a complexing agent.

25. The composition of claim 24, wherein the complexing agent is ammonium zirconium carbonate.

26. The composition of claim 1, wherein the at least one terephthalate ionomer is a polyalkylene terephthalate ionomer.

27. The composition of claim 1, wherein the at least one terephthalate ionomer is a polyethylene terephthalate ionomer.

28. The composition of claim 1, wherein the at least one terephthalate ionomer is co-polymerized with a hydrophobic compound.

29. The composition of claim 1, wherein the at least one terephthalate ionomer is co-polymerized with a hydrophobic compound comprising a C6 to C24 straight chain fatty acid, a C6 to C24 branched fatty acid, a triglyceride thereof, or any mixture thereof.

30. A process for producing the liquid coating composition of claim 1 comprising the steps of:
  a) providing an aqueous solution and/or dispersion of at least one terephthalate ionomer comprising anionic substituents selected from sulfonate, carboxylate and/or phosphate groups, wherein the at least one terephthalate ionomer has an acid value of at least 1 mg KOH/g ionomer,
  b) providing at least one calcium carbonate containing filler,
  c) mixing the aqueous solution and/or dispersion of the at least one terephthalate ionomer of step a) and the at least one calcium carbonate containing filler of step b),
  wherein a buffer is added
  (i) during step a), or
  (ii) during steps a) and b), or
  (iii) during steps a) and c), or
  (iv) during steps a), b) and c)
  to provide in the obtained liquid coating composition a pH in the range from 6.5 to 11.

31. The process of claim 30, further comprises the step of adding a complexing agent before, during and/or after step c).

32. A packaging material comprising
  a cellulose-based substrate having a first and a reverse side, and
  at least one barrier layer being in contact with the first side or the reverse side of the substrate,
  wherein the at least one barrier layer comprises at least one terephthalate ionomer and at least one calcium carbonate containing filler, and a buffer,
  wherein the at least one terephthalate ionomer comprises anionic substituents selected from sulfonate, carboxylate and/or phosphate groups and has an acid value of at least 1 mg KOH/g ionomer.

33. A process for producing the packaging material of claim 32 comprising of the following steps:
  A) providing a cellulose-based substrate having a first and a reverse side,
  B) applying a liquid coating composition according to claim 1 on the first side of the substrate to form a barrier layer, and
  C) drying the barrier layer.

34. The process of claim 33, which further comprises carrying out steps B) and C) on the reverse side of the substrate to manufacture a packaging material being coated on the first and the reverse side.

35. A barrier layer for packaging materials comprising the liquid coating composition of claim 1 comprising at least one terephthalate ionomer and at least one calcium carbonate containing filler as a barrier layer, wherein the at least one terephthalate ionomer comprises anionic substituents selected from sulfonate, carboxylate and/or phosphate groups and has an acid value of at least 1 mg KOH/g ionomer.

36. A packaging material for food packing applications and/or food displays comprising the barrier layer according to claim 35.

* * * * *